Nov. 17, 1936.    R. M. NARDONE    2,061,167

CLUTCH MECHANISM

Original Filed April 30, 1932

INVENTOR.
Romeo M. Nardone
BY
ATTORNEY.

Patented Nov. 17, 1936

2,061,167

UNITED STATES PATENT OFFICE 2,061,167

CLUTCH MECHANISM

Romeo M. Nardone, East Orange, N. J., assignor, by mesne assignments, to Eclipse Aviation Corporation, East Orange, N. J., a corporation of New Jersey Original application April 30, 1932, Serial No. 608,520. Divided and this application June 2, 1934, Serial No. 728,794

3 Claims. (Cl. 192—45)

This invention relates to clutch mechanism, and particularly to clutch mechanism of the plural roller type.

An object of the invention is to provide automatic means for controlling the effectiveness of a clutch of the plural roller type. This and other objects of the invention will become apparent from inspection of the following specification when read with reference to the accompanying drawing wherein is illustrated the preferred embodiment of the invention. It is to be expressly understood, however, that the drawing is for the purpose of illustration only, and is not designed as a definition of the limits of the invention, reference being had to the appended claims for this purpose.

Figure 1:
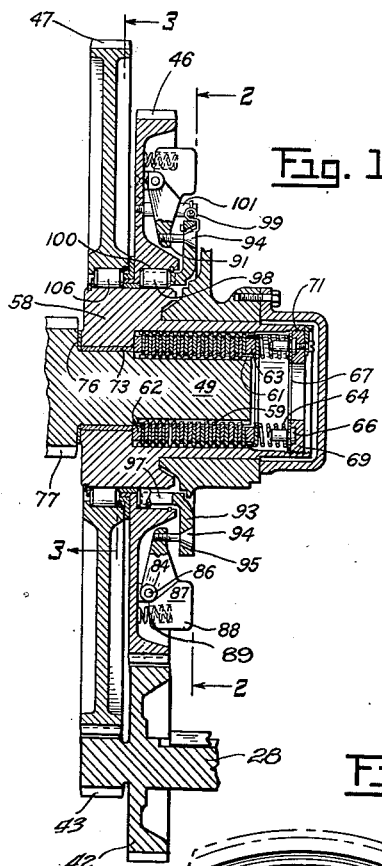
Fig. 1 is a central sectional view of a device embodying the invention.

Referring to the drawing, there is disclosed therein a driving mechanism including a pair of gears 46 and 47 rotatable about the axis of a shaft 49 having teeth 77 at one end thereof for connection with any member which is to be driven, the gear 46 being the driving member under certain conditions as will appear more fully hereinafter and the gear 47 being the driving member under other conditions.

As shown, the drive is transmitted to the shaft 49 by way of one or the other of gears 46—47 and a shouldered sleeve or barrel 58 surrounding the shaft 49 and adapted to have a yielding driving connection therewith, through the provision of a suitable torque limiting clutch which, in the form shown, includes a plurality of annular friction discs 59 having connection alternately with the splined inner surface of the sleeve 58 and the splined portion 61 of the shaft 49. The clutch discs may be held in frictional engagement by the provision of annular pressure plates 62 and 63 at opposite ends of the disc assembly; the pressure maintained on the plates being adjustable by the provision of a series of coiled compression springs 64 disposed at intervals of equal distances from the axis of the shaft 49 and adjustably held in place by the provision of pins 66 extending inwardly from a retaining ring 67 which is in turn secured in place by the pressure of adjusting ring 69 threadedly engaging the sleeve 58 near its outer end as indicated at 71. A friction reducing sleeve 73 may, if desired, be interposed between the shaft 49 and the sleeve 58 to facilitate relative rotation therebetween when the clutch discs slip upon application of excessive load. A similar friction reducing washer 76 may be interposed between the end of sleeve 58 and the toothed portion 77 of the shaft 49.

In the embodiment herein shown, the gears 46 and 47 are intended to operate alternately to connect a common prime mover (such as the variable speed flywheel shown at "6" in my co-pending application hereinafter identified) with the shaft 49; and it is therefore to be understood that the gears 46 and 47 represent any suitable pair of alternately operable driving members rotatable at different speeds and successively effective to drive the shaft 49 first at one predetermined speed, and then at a different speed bearing a definite ratio to the first. It will of course be obvious that in installations where it is desired to change from a driving condition to a free wheeling condition or vice versa, the mechanism to be described will operate to effect such change rather than to produce the ratio change above referred to.

Figure 2:
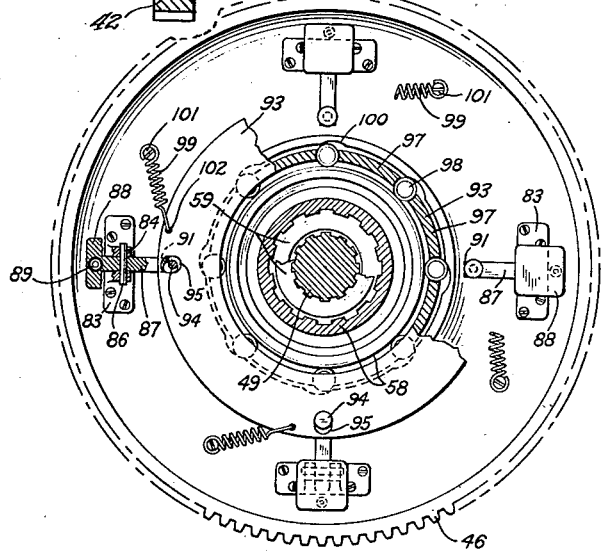
Fig. 2 is a transverse sectional view taken substantially along the line 2—2 of Fig. 1.

In furtherance of this end, the gear 46 has riveted or otherwise secured to its lateral surfaces at equal angular intervals along a circle concentric with its periphery, a plurality of plates 83 (Figs. 2 and 4) on which are formed brackets 84 journally receiving the pins 86 extending through transversely disposed openings in a corresponding plurality of weights 87 of greater mass at the portions remote from the axis of rotation, as indicated at 88, the said portions 88 being recessed to receive compression springs 89, the opposite ends of which abut the face of the gear 46, and thus tend to hold the weights in the position indicated in Figs. 1 and 2 against the action of centrifugal force which tends to swing these weights in a direction such as to move the inner ends 91 to the right, as viewed in Fig. 1 and thus permit a corresponding movement of cage 93 with which the inner portions 91 of the weights are operatively linked through suitable means as indicated at 94. As shown best in Figs. 1 and 4, the cage 93 has conical openings 95 at the points through which the members 94 pass and the latter have corresponding conical heads permitting the movement thereof relative to the cage. Normally the cage 93 rotates in unison with the gear 46 to which it is secured through the connecting axially extending fingers 97 (Fig. 1) between which are mounted rollers 98 received in pockets 100 provided by recessing the inner surface of the gear 46. Springs 99, anchored to pins 101 extending outwardly from the gear 46 and hooked at their opposite ends to the cage 93 as indicated at 102, tend to draw the cage 93 in a clockwise direction relative to the gear 46, as viewed in Fig. 2, and thus draw the rollers 98 toward the centers of the pockets 100 formed between the gear 46 and the sleeve 58, but such tendency is unavailing so long as the position of the weights 88 is such as to hold the conical heads of the pins 94 in firm engagement with the conical seats in the cage 93.

Figure 3:
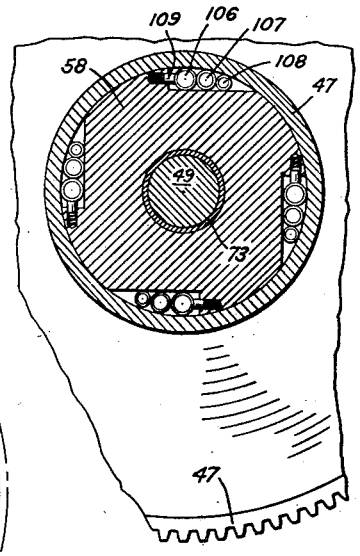
Fig. 3 is a transverse sectional view taken along the line 3—3 of Fig. 1.

In order to eliminate the drive from the gear 47 to the sleeve 58 when the rollers 98 become effective to connect the gear 46 to the sleeve 58, an overrunning clutch of any suitable construction is interposed between the members 47 and 58. As shown in Fig. 3 such clutch may take a conventional form involving a plurality of rollers 106, 107, and 108 of graduated sizes, normally pressed into engagement with both the recessed surfaces of the sleeve 58 and the inner-cylindrical surface of the hub of the gear 47, by the provision of spring pressed plungers 109, which plungers are however, yieldable to permit free rotation of the rollers when the rotary speed of the sleeve 58 tends to exceed that of the gear 47.

Figure 4:
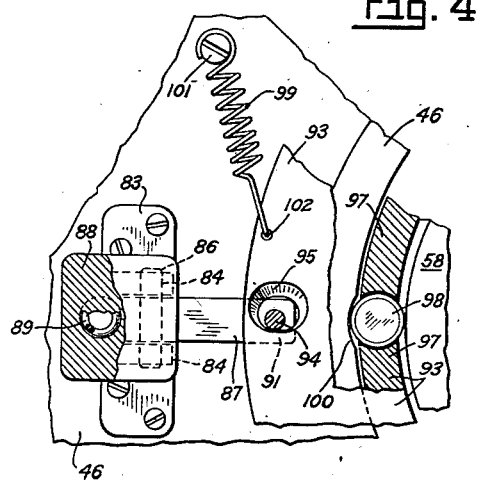
Fig. 4 is an enlarged detail view of a portion of the speed responsive mechanism with certain parts in section, and in relative positions varying from those indicated in Fig. 2.

Having thus described the parts entering into the preferred embodiment of the invention as herein disclosed, it will be apparent that upon energization of the prime mover, not shown, the gear 46 will be rotated and as the device is accelerated, the weights 88 swing about their pivots 86 in response to centrifugal force and thereby produce a corresponding movement of the pins 94 toward their outermost positions, and the springs 99 are accordingly effective to maintain the rollers 98 in the central positions as indicated in Fig. 4 in which positions free relative rotation between the gear 46 and the sleeve 58 is possible.

As the speed of the prime mover falls off to the point at which the springs 89 become effective, the resulting inwardly directed pull on the pins 94 turns the cage 93 relatively to the gear 46 sufficiently to engage the rollers 98 with the surfaces of both the gear 46 and the sleeve 58, with the result that the latter is now driven at a higher speed than gear 47, thus causing the rollers 106, 107, and 108 to overrun the gear 47. The reduction ratio from the driving member to the shaft 49 is thus definitely changed by an amount which is predetermined by the relative pitch diameters of the gears 46 and 47 and the elements meshing therewith.

There is thus provided, in the present invention, a novel mechanism wherein the speed of rotation of the driven member is definitely increased relatively to the speed of the driving member at an intermediate stage in the driving operation. Novel speed responsive means have been provided for effecting this change in driving ratio, which speed responsive means is believed to involve novelty per se, and accordingly, in itself forms part of the present invention. It is to be understood however, that the particular speed responsive means shown may be varied in certain respects as permitted within the scope of the definitive terms employed in the appended claims.

This application is a division of my co-pending application No. 608,520 filed April 30th 1932, which has matured into Patent No. 2,024,109, Dec. 10, 1935.

What is claimed is:

1. In a device of the class described, a member to be driven, a driving member surrounding said first named member but spaced therefrom, means including a plurality of rollers for drivably connecting said members, a plurality of angularly spaced pins mounted on said driving member with their axes disposed in a common plane passing transversely through said rollers at a position intermediate the ends thereof, and means rockable on said pins to control movement of said rollers into operative engagement with both said members, and resilient means cooperating with said first named means for moving said rollers in an opposite direction relatively to said driving member.

2. In a device of the class described, a member to be driven, a driving member surrounding said first named member, but spaced therefrom, means including a plurality of rollers for drivably connecting said members, a plurality of angular spaced pins mounted on said driving member with their axes disposed in a common plane passing transversely through said rollers at a position intermediate the ends thereof, and means rockable on said pins to control movement of said rollers into and out of operative engagement with said members.

3. In a device of the class described, a member to be driven, a driving member surrounding said first named member but spaced therefrom, means including a plurality of rollers for drivably connecting said members, a plurality of angularly spaced pins mounted on said driving member with their axes disposed in a common plane passing transversely through said rollers at a position intermediate the ends thereof, and means rockable on said pins to control movement of said rollers into and out of operative engagement with both said members, said last named means including a corresponding plurality of pins movable axially of said driving member, and means for translating the axial movement of said last-named pins into relative movement between said rollers and said driving member about the axis of rotation of said driven member.

ROMEO M. NARDONE.